March 25, 1941.  C. L. EKSERGIAN  2,236,311
BRAKE SHOE
Filed March 29, 1938  2 Sheets-Sheet 1
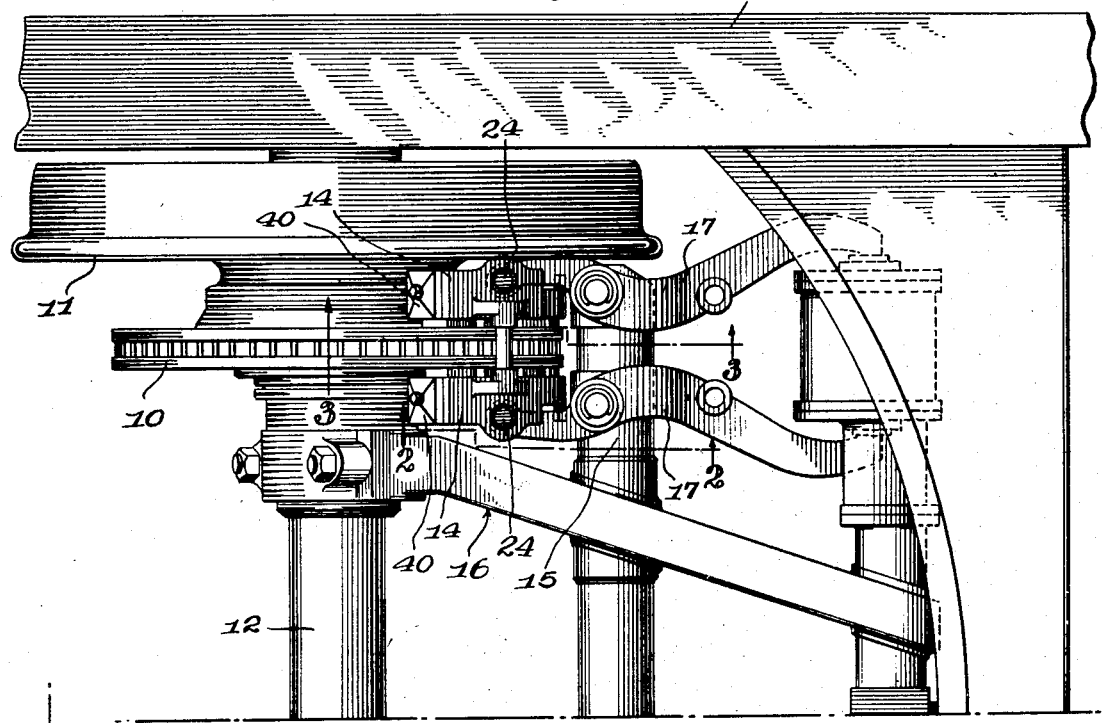
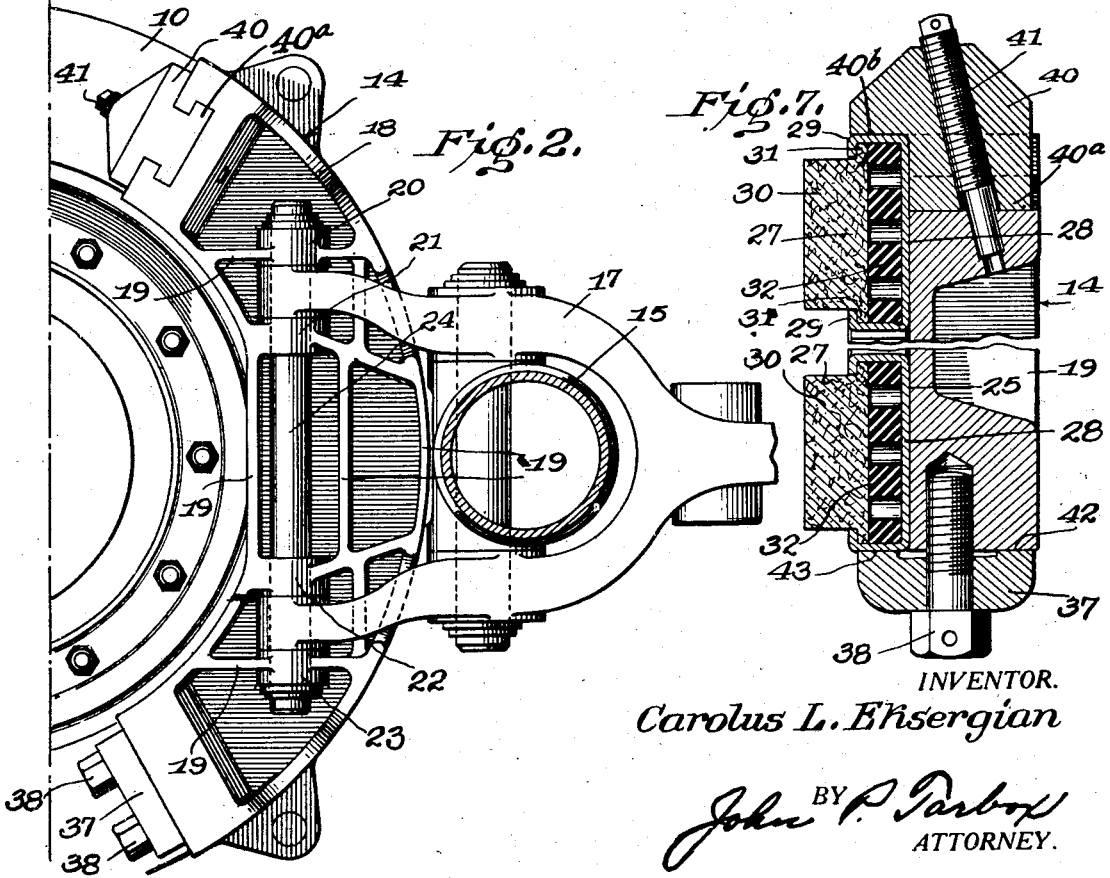
INVENTOR.
Carolus L. Eksergian
BY John P. Tarbox
ATTORNEY.

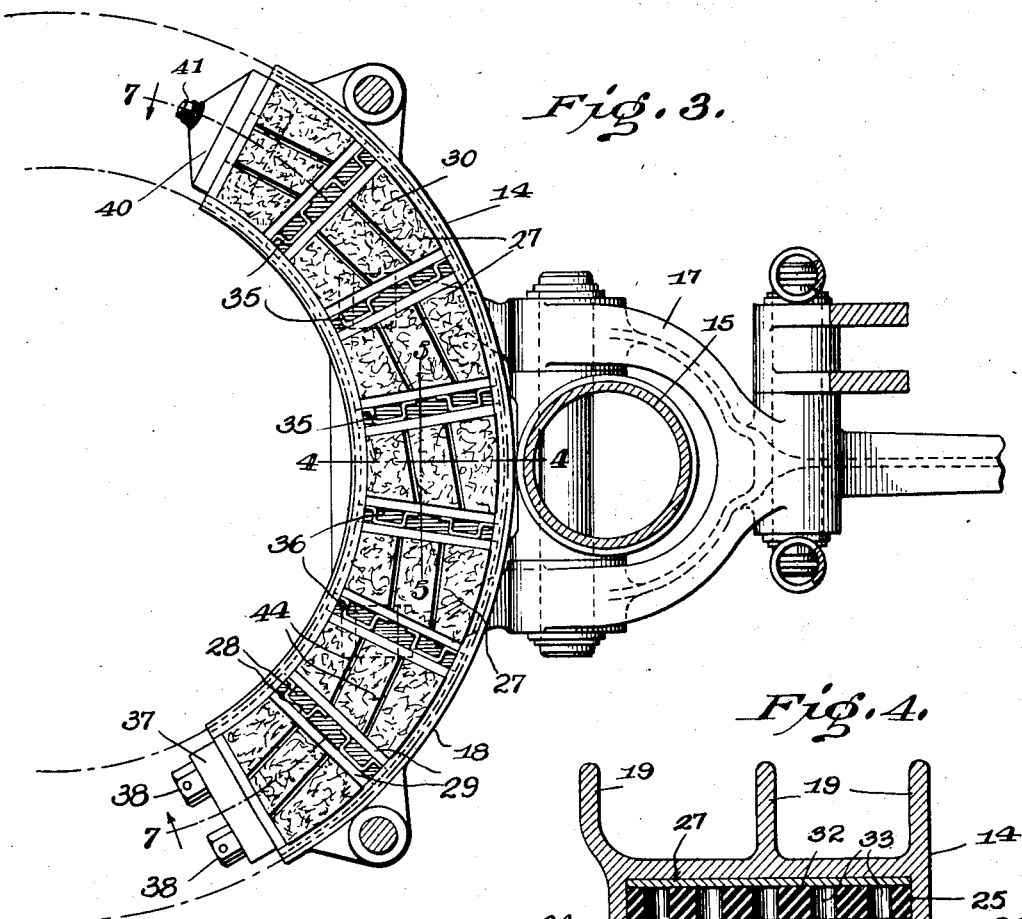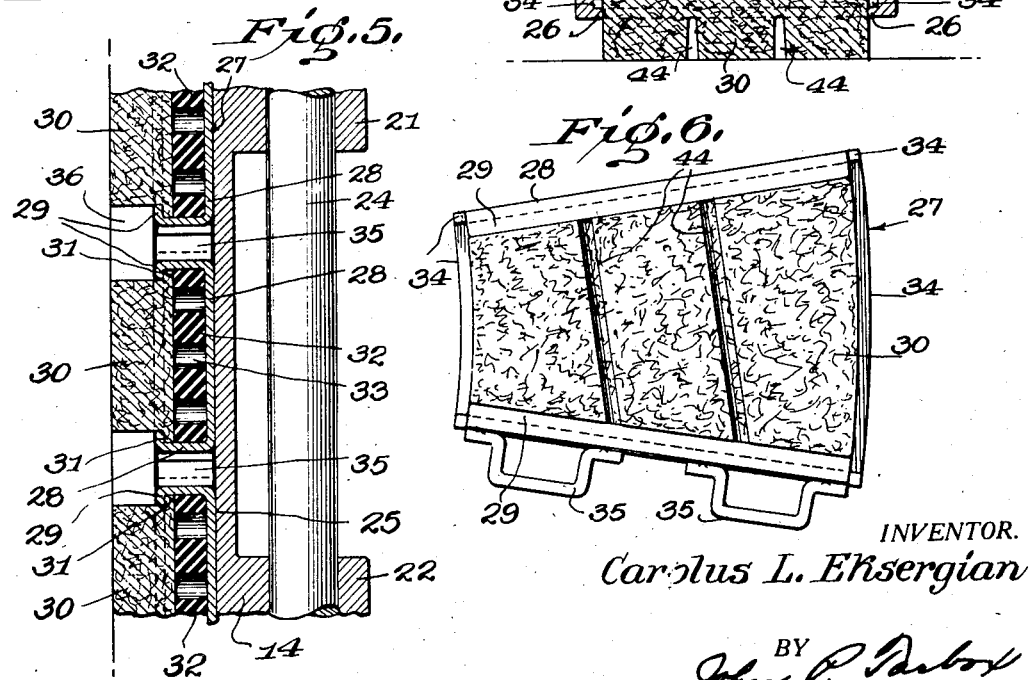

Patented Mar. 25, 1941

2,236,311

UNITED STATES PATENT OFFICE 2,236,311

BRAKE SHOE

Carolus L. Eksergian, Detroit, Mich., assignor to Budd Wheel Company, Philadelphia, Pa., a corporation of Pennsylvania Application March 29, 1938, Serial No. 198,627

9 Claims. (Cl. 188—244)

The invention relates to brake shoes and more particularly to segmental shoes adapted to engage the member being braked over a limited arc thereof. It is among the objects of the invention to provide a shoe of this class which is rigid against distortion yet relatively light in weight, which permits the ready assembly and disassembly of the brake lining therewith, in which the braking lining is so disposed as to insure substantially equal bearing pressures throughout, in which the lining and brake member are efficiently cooled, and in which the brake lining units can be readily produced by quantity production methods. A further object is the provision of a brake shoe in which the lining can be changed with the shoe in situ.

The means by which these objects are attained and other and further advantages and objects will become apparent from the following detailed description when read in connection with the accompanying drawings.

In the drawings:

Figure 1 is a fragmentary plan view of a truck brake mechanism to which the invention is shown applied.

Figure 2 is a partial sectional elevation taken substantially on the line 2—2 of Figure 1 looking in the direction of the arrows at the ends of the section line, shown on an enlarged scale.

Figure 3 is a sectional elevation taken substantially on the line 3—3 of Figure 1 looking in the direction of the arrows at the ends of the section line, also on enlarged scale.

Figures 4 and 5 are detailed sectional views taken substantially on the lines 4—4 and 5—5 of Figure 3.

Figure 6 is a detail view of one of the brake block unit assemblies, and

Figure 7 is a detail sectional view taken substantially on the line 7—7 of Figure 3 looking in the direction of the arrows at the ends of the section line, the central portion of the shoe being broken away.

In the drawings, the shoe of my invention is shown applied to a brake mechanism such as that described and claimed in my copending application Serial No. 198,398, filed March 28, 1938. Such mechanism comprises a brake disc 10 secured to the wheel 11 mounted on the axle 12 in turn mounted in the truck frame 13. The brake shoes 14 according to the invention are mounted in pairs on a transverse member 15 of a brake mechanism supporting frame designated generally by the numeral 16. Tong-like levers 17 support the brake shoes for simultaneous actuation into engagement with the opposite faces of the brake disc 10. The shoes are of substantially identical construction and the same reference characters will be applied in referring to either the right or left-hand shoe.

As clearly appears in the detail views, Figures 2, 4, 5 and 7, the brake shoe is of segmental shape and extends through approximately an angle of 120 degrees. It comprises a rigid backing member 18 preferably formed as a casting and formed around its periphery and transversely thereof with strengthening and stiffening ribs 19. It is also formed with spaced bearings 20, 21, 22, 23 which are tied to the ribbing 19 and adapted to receive between them the bifurcated end of the actuating lever 17 which is secured to the shoe by bearing pin 24 extending through bearings 20, 21, 22 and 23 and the ends of the furcations of the arm 17 received between them. By this arrangement the shoe is borne by its bearings as close as possible to the active braking face thereof thus minimizing the tendency of the shoe to tilt under the braking torque. To further maintain the shoe balanced about the supporting bearings as near as possible, the axis of the bearings is arranged substantially in the transverse plane of the center of gravity of the shoe.

In its opposite face the shoe is formed with a recess running the length of the shoe and designated by the numeral 25. This recess is of channel shape and the side walls of the channel are provided with overhanging flanges 26 for a purpose which will presently appear.

To facilitate the fabrication and replacement of the brake lining, it is fabricated in separate unit subassemblies designated generally by the numeral 27, these subassembly units, as shown in Figure 3, being in the present instance seven in number. The subassembly units are of identical shape and size and are constructed as follows: A sheet metal plate 28 of channel cross section, as appears in Figure 5, and of segmental shape, as appears in Figure 6, has its side walls formed with overhanging flanges 29. A correspondingly shaped brake lining block 30 and having laterally extending flanges 31 can be assembled with this base plate by endwise movement until the lateral flanges 31 lock under the flanges 29 of the plate. The brake lining block is preferably spaced from the bottom of the channel 28 by a resilient cushion block 32 which may be made of rubber. In order to permit the bearing face of the block to adjust itself to equal bearing pressure upon the brake disc over its entire surface, this rubber cushion block is preferably provided with a number of perforations 33 forming air spaces into which the rubber can expand when compressed. At its ends the plate 28 is formed with extensions 34 of reduced height and in the assembly of the brake block unit with the brake shoe backing member 18, these extensions 34 engage under the overhanging flanges 26 of the channel 25 to lock the brake block units to the backing.

It is desirable also, to provide for proper ventilating of the shoe and the brake surface which it engages, to space the brake block units apart and this may conveniently be done by welding the channel section spacers 35 to one side wall of the plate 28. This spacing provides passages 36 of substantial width between the adjacent brake blocks through which the cooling air may circulate.

All of the units assembled with the brake shoe backing are provided with these spacers except the lowermost shown in Figure 3 which abuts against the end closure 37 of the channel 25. This end abutment 37 may be held in place by a pair of screws 38 and the brake block units are assembled with the backing by inserting them successively through the open upper end as shown in Figure 3 until the last one is in place. Preferably during this loading of the backing with the brake shoe blocks, the abutment or end closure 37 is backed off slightly so that when the last one of the units is inserted from the top, the closing abutment 40 can be slid laterally in place with its T-section base 40ª (see Figs. 2 and 7) engaging the correspondingly shaped groove in the top of the backing member 18 and then located laterally in place by the locking pin 41. In this position an over-hanging shoulder 40ᵇ closes the upper end of the channel 25. The units are then clamped together tightly in the shoe by taking up on the screws 38 which swings the closure block 37 about its bearing face 42 and causes its opposed bearing face 43 to press against the end unit as is clear from Figure 7.

To render the lining blocks 30 flexible and insure that they will engage throughout their contacting area with the brake disc with equal pressures, they are formed with a plurality of deep grooves 44 which in the form shown extend parallel to each other and at an angle to the longitudinal axis of the unit. This arrangement avoids the possibility of unequal wear upon the brake disc.

While I have herein described a specific embodiment which the invention may take, it will be understood that changes and modifications may be made by those skilled in this art without departing from the spirit and scope of the invention as expressed in the following claims.

What I claim is:

1. A brake block subassembly unit for assembly with a brake shoe backing member comprising a channel section plate having overhanging side edge flanges, a brake lining block inserted in the channel section plate and having side extensions locking under said overhanging flanges, and a yieldable cushion between said block and the bottom of the channel plate pressing the block against the overhanging side edge flanges and thereby frictionally retaining it in place.

2. A segmental brake shoe having a backing member having a channel in one face thereof with lateral flanges overhanging the sides of the channel, a plurality of brake blocks assembled from one end of the channel and having means locking under the overhanging flanges of the channel, said brake blocks being spaced apart throughout an appreciable distance to provide passages for the circulation of cooling air and yielding backing means individual to each of said blocks.

3. A segmental brake shoe comprising a backing member having a recess in one face thereof, a plurality of brake lining blocks secured in said recessed face and having outer brake engaging faces, yielding means interposed between the brake lining blocks and the bottom of the recess in which they are secured, and deep grooves formed in the brake engaging faces of said blocks to give flexibility thereto.

4. A segmental brake shoe comprising a backing member having a channel in one face thereof, brake blocks associated with said channel and locked therein by interengaging means between the channel sides and blocks, rubber cushion means individually backing said blocks, said cushion means having air pockets to facilitate the even compression thereof under braking action and permit the braking face of the shoe to bear with substantially uniform pressure throughout upon an opposing brake member.

5. A segmental brake shoe having a backing member having circumferential and transverse ribs on one face thereof to stiffen the same against distortion, spaced bearings projecting from said face but not substantially beyond said ribbing, said bearings forming part of the means for attaching an actuating member to the shoe.

6. A segmental brake shoe for engagement with a substantially radial braking face comprising a backing member having means on one face thereof to secure a plurality of readily replaceable brake blocks, and means on the opposite side thereof for supporting the shoe, said last named means including spaced aligned bearings on the backing member, the axes of said bearings being arranged substantially in the transverse vertical plane of the center of gravity of the brake shoe.

7. A segmental brake shoe comprising a backing member having a channel on one face thereof closed at one end by a removable abutment, a plurality of brake blocks insertable in said channel from the said end when the abutment is removed and means closing the opposite end of the channel and comprising clamping means movable endwise of the channel whereby to clamp the blocks together and against said abutment.

8. A segmental brake shoe comprising a backing member having a recess in one face thereof, a plurality of brake lining blocks secured in said recessed face and having outer braking faces, yielding means individual to said blocks and interposed between the blocks and the bottom of the recess in which they are secured, and deep grooves formed in the braking faces of said blocks to give flexibility thereto, the grooves extending at a slight angle to the direction of movement between the shoe and the braking member with which it is adapted to cooperate.

9. A segmental brake shoe having a backing member formed with a channel extending lengthwise along one face thereof and in which a plurality of brake block units slidable into the channel from one end thereof are adapted to be held with their side edges formed to extend under overhanging side flanges of the channel, characterized by the fact that each of the brake block units comprises a channel member extending, when assembled, transversely to the channel in the backing member and having overhanging side flanges so that a brake block inserted into said transverse channel will be locked in position in the final assembly by the side flanges of both the channel of the brake block unit and the channel in the backing member.

CAROLUS L. EKSERGIAN.